United States Patent [19]
Wong

[11] Patent Number: 5,387,848
[45] Date of Patent: Feb. 7, 1995

[54] FLUORESCENT LAMP BALLAST WITH REGULATED FEEDBACK SIGNAL FOR IMPROVED POWER FACTOR

[75] Inventor: John M. Wong, Buffalo Grove, Ill.

[73] Assignee: Philips Electronics North America Corporation, New York, N.Y.

[21] Appl. No.: 76,566

[22] Filed: Jun. 14, 1993

Related U.S. Application Data

[63] Continuation-in-part of Ser. No. 1,940, Jan. 8, 1993, Pat. No. 5,313,142, which is a continuation of Ser. No. 846,370, Mar. 5, 1992, abandoned.

[51] Int. Cl.⁶ .................. H05B 41/29; H05B 41/36
[52] U.S. Cl. .................................. 315/224; 315/205; 315/209 R; 315/227 R; 315/247; 315/307; 315/DIG. 5
[58] Field of Search ............... 315/205, 209 R, 224, 315/226, 227 R, 247, 287, 291, 307, DIG. 5

[56] References Cited

U.S. PATENT DOCUMENTS

| | | | |
|---|---|---|---|
| 4,935,672 | 6/1990 | Lammers et al. | 315/200 R |
| 5,050,057 | 9/1991 | Notohara et al. | 363/37 |
| 5,057,749 | 10/1991 | Nilssen | 315/247 |
| 5,059,867 | 10/1991 | Nerone et al. | 315/247 |
| 5,063,331 | 11/1991 | Nostwick | 315/307 X |
| 5,223,767 | 6/1993 | Kulka | 315/205 X |

*Primary Examiner*—David Mis
*Attorney, Agent, or Firm*—Edward Blocker

[57] ABSTRACT

A fluorescent lamp ballast having improved power factor by providing high frequency signals fed back to the a.c. side of the ballast rectifier. The feedback signal is regulated by limiting or reducing the voltage gain of the feedback signal based on the level of the unregulated feedback signal or rectified signal, respectively.

20 Claims, 2 Drawing Sheets

FLUORESCENT LAMP BALLAST WITH REGULATED FEEDBACK SIGNAL FOR IMPROVED POWER FACTOR

CROSS REFERENCED TO RELATED APPLICATIONS

This is a continuation-in-part of U.S. patent application Ser. No. 08/001,940, filed Jan. 8, 1993, which has issued as U.S. Pat. No. 5,313,142 on May 17, 1994, which is a continuation of U.S. patent application Ser. No. 07/846,370, filed Mar. 5, 1992, now abandoned.

BACKGROUND OF THE INVENTION

This invention relates generally to a fluorescent lamp ballast, and, more particularly to an electronic fluorescent lamp ballast with improved power factor.

Conventional electronic fluorescent lamp ballasts typically include one or more electrolytic capacitors for storing and providing a DC voltage to an inverter. The inverter produces a high frequency signal, a portion of which is fed back for storage by the one or more electrolytic capacitors for purposes of achieving and maintaining a relatively high power factor.

When the lamp fails to ignite or is inadvertently disconnected from the ballast after ignition, the signal fed back can increase resulting in the voltage across the one or more electrolytic capacitors rising to a level which can destroy the latter or other components within the ballast.

SUMMARY OF THE INVENTION

Generally speaking, in accordance with the invention, a ballast includes a rectifier for receiving and rectifying both a first signal and a regulated feedback signal. The regulated feedback signal, which is indicative of an output signal produced by an inverter of the ballast, is produced by a feedback circuit. The feedback circuit produces the regulated feedback signal based on an unregulated feedback signal (i.e. output signal).

By regulating the feedback signal, a relatively high power factor for the ballast can be achieved. Destructively high levels of the feedback signal, which can occur when the lamp fails to ignite or remain ignited are avoided. More particularly, potentially high levels of feedback signal are eliminated by regulating the feedback signal supplied to the input of the rectifier. The voltage stored across the one or more electrolytic capacitors of the ballast are therefore prevented from rising to levels which can destroy the one or more electrolytic capacitors or other components within the ballast.

In accordance with a feature of the invention, the feedback circuit includes a current limiting device for limiting the current level and thereby effectively limiting the voltage level of the regulated feedback signal. The current limiting device preferably includes at least one zener diode.

In accordance with another feature of the invention, the feedback circuit includes control circuitry for diverting a portion of the unregulated feedback signal. The non-diverted portion of the unregulated feedback signal serves as the regulated feedback signal supplied to the input of the rectifier. Preferably, the control circuit exhibits a varying level of capacitance based, in part, on the regulated feedback signal including, for example, at least two capacitors switchably connected in parallel with each other.

In other words, regulation of the feedback signal is achieved by either limiting the maximum level of the feedback signal or by reducing the level of the feedback signal once the latter reaches a predetermined level.

In accordance with another object of the invention, a method for ballasting a lamp includes rectifying a first signal and a feedback signal so as to produce a rectified signal, supplying an output signal to the lamp and regulating the feedback signal based on the rectified signal. Alternatively, the feedback signal is regulated based on the output signal rather than the rectified signal. In both methods the feedback signal is indicative of the output signal.

Accordingly, it is an object of the invention to provide an improved ballast having a relatively high power factor in which the likelihood of destructively high voltage levels appearing across ballast components is minimized.

It is another object of the invention to provide an improved ballast in which a high frequency feedback scheme is employed in providing a ballast with relatively high power factor.

Still other objects and advantages of the invention will, in part, be obvious, and will, in part, be apparent from the specification.

The invention accordingly comprises several steps and a relation of one or more such steps with respect to each of the others, and the device embodying features of construction, combination of elements and arrangements of parts which are adapted to effect such steps, all is exemplified in the following detailed disclosure, and the scope and the invention will be indicated in the claims.

BRIEF DESCRIPTION OF THE DRAWINGS

For a fuller understanding of the invention, reference is had to the following description taken in combination with the accompanying drawings, in which.

DETAILED DESCRIPTION OF THE PREFERRED EMBODIMENTS

Figure 1:
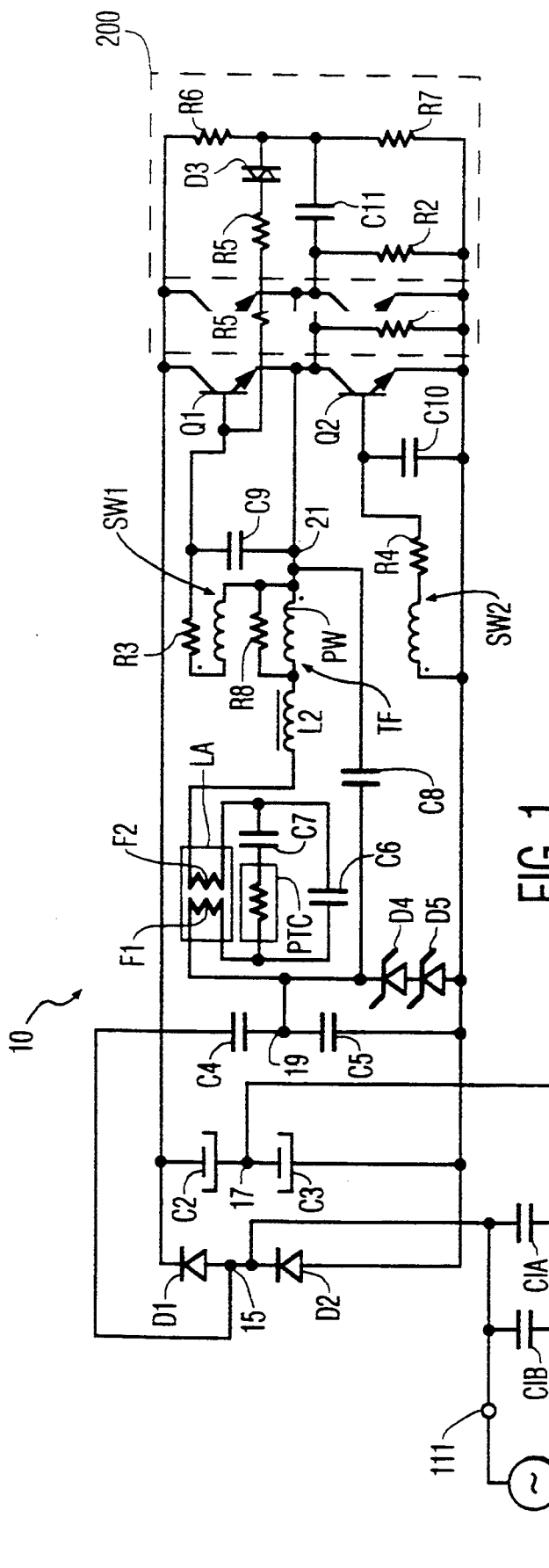
FIG. 1 is a schematic diagram of a ballast in accordance with one embodiment of the invention.

As shown in FIG. 1, a ballast 10 in accordance with a first embodiment of the invention is connected to an a.c. power line represented as an a.c. source 100 at a pair of input terminals 111 and 113. Connected to input terminal 111 are capacitors C1B and C1A. Connected to input terminal 113 are capacitor C1B and an inductor L1B. Capacitors C1A and C1B and inductor L1B serve together as an electromagnetic interference (EMI) filter for filtering high frequency components inputted thereto and thereby lowering conducted and radiated EMI. Accordingly, any EMI interference generated by ballast 10 is prevented from entering the power line.

Connected to the junction of capacitor C1A and inductor L1B is an inductor L1A. Inductor L1A is also connected to a junction joining together a pair of electrolytic capacitors C2 and C3 at a node 17. The junction joining together input terminal 111 and capacitors C1A and C1B is also connected to a node 15. A diode D1 is connected between node 15 and capacitor C2. A diode D2 is connected between node 15 and capacitor C3. Diodes D1 and D2 form a half bridge rectifier and in combination with capacitors C2 and C3 operate as a voltage doubler, that is, doubling the peak a.c. voltage of source 100. This voltage doubler serves as a d.c. power source within ballast 10 providing a voltage across the series combination of capacitors C2 and C3 which is at twice the peak voltage of a.c. source 100.

Ballast 10 also includes a half bridge inverter having a pair of NPN transistors Q1 and Q2 and a capacitor C5. Capacitor C5 is connected to the junction joining diode D2 and capacitor C3 together and to a node 19. A capacitor C4 is connected to node 15 and capacitor C5 at node 19. Capacitor C4, as discussed below, serves as a feedback path providing a high frequency signal to the input of the half bridge rectifier represented by diodes D1 and D2.

Ballast 10 also includes a starter 200 for starting the half bridge inverter. Starter 200, discussed in greater detail below, includes four resistors R2, R5, R6 and R7, a capacitor C11 and a diac D3. Resistor R6 and a collector of transistor Q1 and one end of resistor R6 are connected to the junction joining diode D1 and capacitor C2 together. An emitter of transistor Q1 is connected to a collector of transistor Q2, resistor R2 and capacitor C11. An emitter of transistor Q2, resistor R2 and resistor R7 are connected to the junction joining diode D2 and capacitors C3 and C5 together. Resistors R6 and R7 serve as a voltage divider for dividing the voltage stored across the series combination of capacitors C2 and C3. Capacitor C11 and diac D3 are connected to a junction joining resistors R6 and R7 together. Resistor R5 is connected between diac D3 and a base of transistor Q1.

Ballast 10 also includes a transformer TF which includes a primary winding PW and a pair of secondary windings SW1 and SW2. Secondary winding SW2 is serially connected to a resistor R4 which together are connected in parallel across a capacitor C10. Capacitor C10 is connected between a base and the emitter of transistor Q2. Secondary winding SW1 is serially connected to a resistor R3, the serial combination being connected in parallel with a capacitor C9. Capacitor C9 is connected between a base and the emitter of transistor Q1.

A resistor R8 is connected in parallel with primary winding PW of transformer TF. Primary winding PW is serially connected to an inductor L2 and to a junction 21 joining the emitter of transistor Q1, collector of transistor Q2, a snubber capacitor C8, capacitor C9, resistor R8 and secondary winding SW2 together.

A positive temperature coefficient (PTC) resistor is serially connected to a capacitor C7, the serial combination being connected in parallel with a capacitor C6 and a lamp LA. Lamp LA is generally of the fluorescent type and is not part of ballast 10. The serial/parallel combination of the PTC resistor, capacitors C6 and C7 and lamp LA are serially connected between inductor L2 and node 19 joining capacitors C4 and C5 together.

Snubber capacitor C8 is connected in parallel between node 19 and junction 21. A pair of zener diodes D4 and D5 are serially connected in parallel with capacitor C5.

Operation of ballast 10 is as follows. When an a.c. signal such as provided by a.c. source 100 is provided to input terminals 111, 113 of ballast 10, the a.c. signal is filtered by the EMI filter so as to produce an a.c. signal having a fundamental frequency of 60 Hz provided across capacitor C1A, the latter of which also serves as a high frequency pass filter. The filtered a.c. signal is rectified by the half bridge rectifier of diodes D1 and D2 so as to produce a voltage across capacitors C2 and C3 which is approximately twice the peak voltage of the a.c. signal produced by source 100.

The combination of diodes D1 and D2 and capacitors C2 and C3 serves as a d.c. voltage source for the inverter and starter 200 of ballast 10. This d.c. voltage source applies a d.c. voltage across starter 200 for initiating oscillation of the inverter. More particularly, the d.c. voltage across capacitors C2 and C3 is divided between resistors R6 and R7. Capacitor C11 charges until the threshold (breakdown) voltage of diac D3 is reached. Capacitor C11 now discharges through diac D3, resistor R5 and the base-emitter junction of transistor Q1 and thereby provides a sufficient driving voltage for transistor Q1.

As current flows through transistor Q1 and primary winding PW (with transistor Q2 turned OFF), a voltage is induced across secondary winding SW1 providing the base drive voltage for turning ON transistor Q1. As the magnetic flux density of primary winding PW begins to saturate, the induced voltage across secondary winding SW1 drops to a level which is insufficient to maintain transistor Q1 in a conductive state.

Primary winding PW now induces a voltage across secondary winding SW2 sufficient for turning ON transistor Q2. Current begins to flow through primary winding PW and transistor Q2. The direction of current flowing through primary winding PW when transistor Q1 is turned ON (transistor Q2 being turned OFF) is opposite to the direction of current flowing through primary winding PW when transistor Q2 is turned ON (transistor Q1 being turned OFF). In other words, an alternating current flowing through primary winding PW is produced having a frequency equal to the switching frequency of transistors Q1 and Q2.

The resonant frequency of ballast 10, which is primarily based on inductor L2 and capacitor C6, is near the switching frequency of transistors Q1 and Q2. A relatively high voltage appears across the PTC resistor, the latter of which provides a path for heating a pair of filaments F1 and F2 of lamp LA to permit successful ignition of the latter.

Resistor R8 bypasses current around primary winding PW thereby lowering the self oscillation frequency of the inverter and reshaping the high frequency output signal. A higher lamp current results. Capacitor C7 serves to limit the voltage across the PTC resistor to protect the latter from high voltage levels.

The serial combination of zener diodes D4 and D5 are connected in parallel with capacitor C5 to limit the maximum voltage which can appear across capacitors C2 and C3. Energy returning from the resonant circuit by way of capacitors C4 and C5 and diodes D1 and D2 develops a voltage across inductor L1A. The energy, which is in the form of high frequency signals, in combination with the a.c. line voltage provided by a.c. source 100 results in ballast 10 acting as a high frequency boost converter raising the voltage on each of the electrolytic capacitors C2 and C3 to a level higher than the a.c. line voltage. That portion of the high frequency signal fed back through capacitor C4 to the input of the half bridge rectifier is referred to as the high frequency feedback signal. The feedback signal improves the ballast factor and reduces power line current harmonic distortion. More particularly, the feedback scheme of ballast 10 is based on providing high frequency pulses through capacitor C4 to the input (a.c. side) of the bridge rectifier at node 15 so as to supplement the a.c. power line voltage. The improved power factor results in ballast 10 drawing a much lower current from the power line.

As the flow of current through primary winding PW enters its non-linear flux density region (i.e. begins to saturate), the base drive of transistor Q1 associated with secondary winding SW rapidly decreases turning OFF transistor Q1. That is, the current through primary winding PW drops to a zero level. Secondary winding SW2 now induces a current for driving transistor Q2 and therefore turns ON the latter. The voltage stored across capacitors C4 and C5 serve as the d.c. voltage sources for transistors Q1 and Q2 during the conductive portion of each transistor, respectively. Operation of ballast 10 is similar to that disclosed in FIG. 1 of U.S. Pat. No. 5,313,142, reference thereto being incorporated herein for purposes of construction and operation of ballast 10. That is, for each half cycle of oscillation, either capacitor C2 or capacitor C3 serves as the voltage source.

The frequency of operation of ballast 10 typically ranges from about 25 to 60 KHZ and is controlled in part, by the non-linearity of the hysteresis curve of transformer TF.

Capacitor C4 is the main feedback capacitor along which the regulated feedback signal flows. Capacitor C5 ratios the amount of the unregulated feedback signal entering node 19, which is divided between the capacitor voltage divider network of capacitors C4 and C5.

Zener diodes D4 and D5, each of which are of the power type, limit the maximum voltage which can be present across capacitor C5. When either lamp LA is not ignited, is not connected to ballast 10 or for any other reason fails to remain lit, the level of the feedback signal can become excessive resulting in voltages appearing across capacitors C2 and C3 which can damage the latter and/or other components within ballast 10. Zener diodes D4 and D5 serve as active clamps to limit the voltage across C5 and therefore indirectly limit the feedback signal flowing through capacitor C4.

Figure 2:
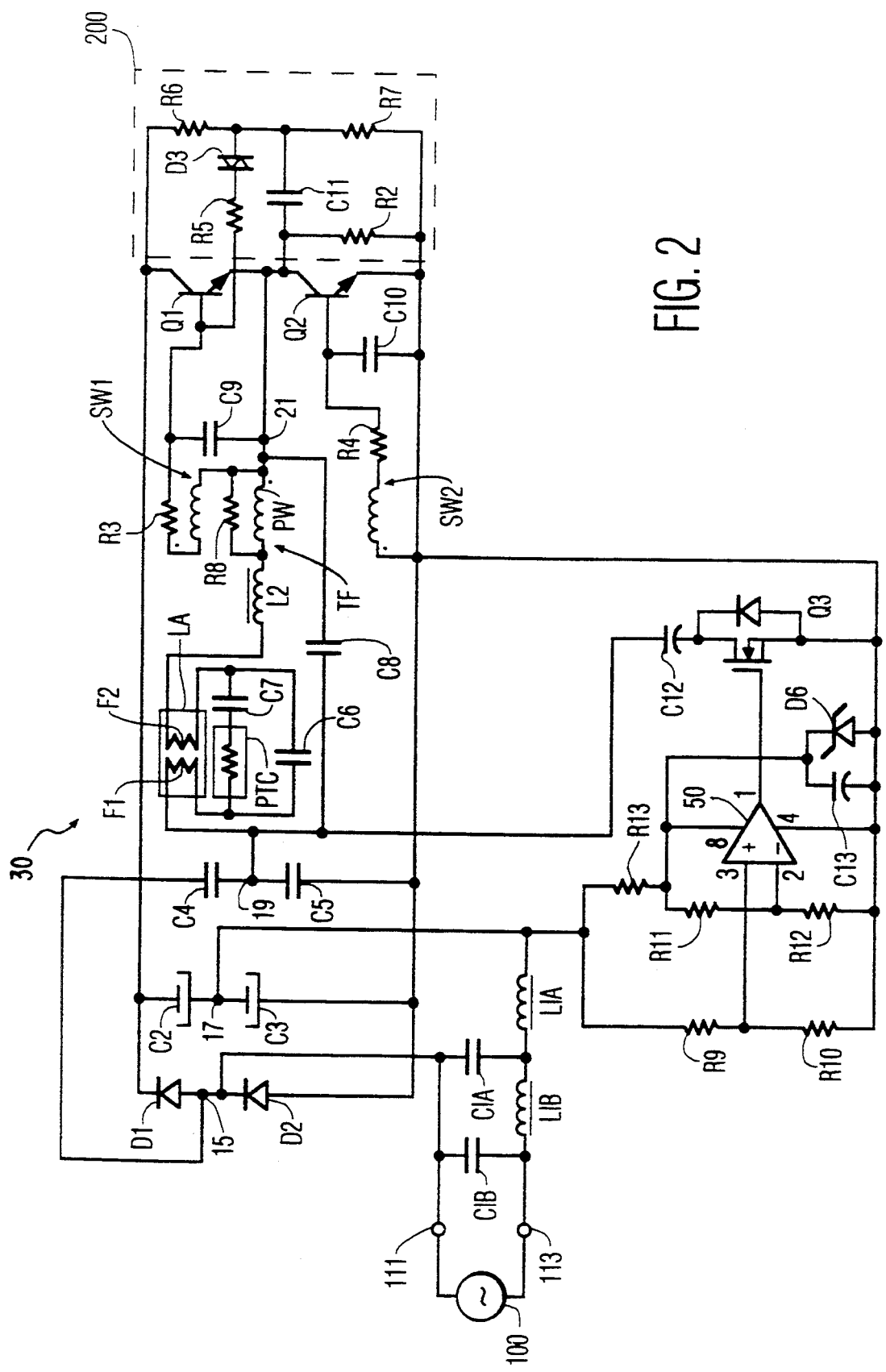
FIG. 2 is a schematic diagram of a ballast in accordance with an alternative embodiment of the invention.

In accordance with an alternative embodiment of the invention, a ballast 30, shown in FIG. 2, employs a different feedback scheme from that of ballast 10 in maintaining the voltage across electrolytic capacitors C2 and C3 at acceptable levels. Those components of ballast 30 similar in construction and operation to ballast 10 have been identified by like reference numerals and will not be further described herein.

Ballast 30 includes an active switching arrangement 40 for selectively placing a capacitor C12 in parallel with capacitor C5 in order to maintain the feedback signal flowing through capacitor C4 within an acceptable current/voltage range. Active switching arrangement 40 overcomes certain inherent drawbacks associated with zener diodes D4 and D5. More particularly, zener diodes have relatively high manufacturing tolerances, are temperature sensitive and have limited power capabilities. These drawbacks are overcome by active switching network 40.

Network 40 includes a metal oxide semiconductor field effect transistor (MOSFET) Q3. MOSFET Q3 and capacitor C12 are serially connected in combination across capacitor C5. Switching of MOSFET Q3 for placing capacitor C12 in parallel with capacitor C5 and for removing capacitor C12 from being connected in parallel with capacitor C5 is based on the voltage at node 17.

Unlike zener diodes D4 and D5 which limit the level of current/voltage of the feedback signal flowing into/being applied at node 15 of ballast 10, ballast 30 varies the level of capacitance within the capacitor voltage divider which includes capacitor C4. The feedback scheme of ballast 30 divides the unregulated feedback signal entering the junction between capacitors C4 and C5 (i.e. node 19). With MOSFET Q3 turned OFF, the unregulated feedback signal is divided based on the capacitor voltage divider network of capacitors C4 and C5. With MOSFET Q3 turned ON, the unregulated feedback signal is divided between capacitor C4 and the parallel combination of capacitors C5 and C12. Active switching network 40 therefore varies the level of capacitance within the capacitive voltage divider in order to reduce the level of current/voltage of the regulated feedback signal (i.e. the high frequency signal across/flowing through capacitor C4).

Ballast 30 regulates the feedback signal entering the half bridge rectifier at node 15 by redirecting a portion of the unregulated feedback signal entering node 19 away from capacitor C4. The regulation scheme of ballast 30 therefore reduces the level of the regulated feedback signal based on the output of the half bridge rectifier. In contrast thereto, ballast 10 regulates the feedback signal entering node 15 based on the voltage level of the unregulated feedback signal, that is, based on the voltage across capacitor C5 (i.e. zener didoes D4, D5). The regulation scheme of ballast 10 (i.e. zener diodes D4 and D5) regulates the voltage that is applied to capacitors C2, C3 by limiting the gain of the feedback circuit. The regulation scheme of ballast 30 (i.e. active switching network 40), however, regulates by cutting/reducing the gain of the feedback circuit.

As can be readily appreciated, the regulation scheme of ballast 30 need not be based on the reference voltage level at node 17 for determining when to turn ON MOSFET Q3. For example, active switching arrangement 40 can be referenced at the junction between capacitor C2 and diode D1. In other words, resistors R9 and R13 of active switching network 40 could be connected to the junction between capacitor C2 and diode D1 rather than to node 17. Node 17 has been chosen as the reference voltage level rather than the junction between capacitor C2 and diode D1 since the voltage level at node 17 is lower than the voltage level at the capacitor C2-diode D1 junction. The lower voltage level at node 17 results in less expensive components being required for active switching network 40.

Active switching network 40 has a resistor voltage divider including resistors R9 and R10 for sensing the level of the regulated feedback signal supplied to a non-inverting input of a comparator 50. A second resistive voltage divider including resistors R11, R12 and R13 senses the d.c. reference voltage at node 17 and supplies same to an inverting input of comparator 50. Comparator 50 is an integrated circuit made by Motorola Company, Phoenix, Ariz. as part no. LM2904D. Comparator 50 includes pins 2 and 3 which serve as the inverting and non-inverting inputs of the comparator. A pin 8 of comparator 50 and pin 4 are connected to the junction between resistors R11 and R13 and to a junction joining resistors R10 and R12 together for providing a source of d.c. voltage and a reference level, respectively. The output of comparator 50 at a pin 1 is applied to a gate of MOSFET Q3 for biasing the latter. A capacitor C13 is connected in parallel with a zener diode D6 which together are in serial combination with resistor R13 and provide the necessary d.c. voltage to power comparator 50. Zener diode D6 insures that the voltage provided to pin 8 does not rise above the internal breakdown voltage of the comparator 50.

Figure 3:
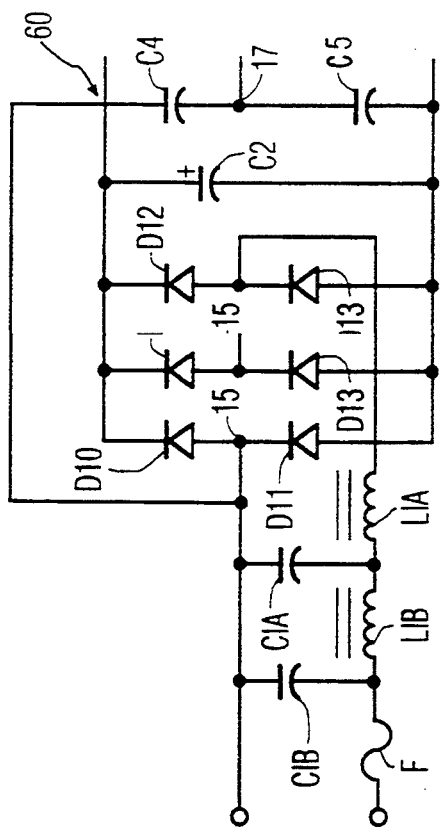
FIG. 3 is a schematic diagram of the front end of a ballast in accordance with another alternative embodiment of the invention.

In accordance with another alternative embodiment of the invention, reference should now be had to FIG. 3 in which a portion of a ballast 60 is shown. Ballast 60 and ballast 10 are substantially the same in construction and operation. The difference between ballast 60 and ballast 10 involves how the filtered a.c. power line voltage is rectified and stored thereafter. More particularly, ballast 60 replaces the half bridge rectifier of ballast 10 and ballast 30 with a full bridge rectifier (diodes D10, D11, D12 and D13). Rather than producing a d.c. voltage of approximately twice the voltage peak of the a.c. power line supplied to input terminals 111 and 113, the d.c. voltage produced by ballast 60 is equal to the voltage peak of the a.c. signal and is stored across a capacitor 20. Inductor L1A is now connected between an anode of diode D12 and a cathode of diode D13. A cathode of diode D12 is connected to the junction joining capacitor C20 and diode D10 together. An anode of diode D13 is connected to the junction joining capacitor C20 and diode D11 together. Ballast 30 can be used for lamps requiring less voltage than lamp LA, that is, the voltage doubling effect of ballasts 10 and 30 required to ignite and power lamp LA is not required for ballast 60. The regulation scheme of ballast 10 or 30 can be employed by ballast 60.

In incorporating the regulation scheme of ballast 10 within ballast 60, zener diodes D4 and D5 are connected in parallel with capacitor C5. In incorporating the regulation scheme of ballast 30 within ballast 60, the reference voltage level of active switching arrangement 40 (i.e., junction joining resistors R9 and R13 together) is chosen as the junction joining diodes D10 and D12 and capacitor C20 together with capacitor C12 connected to node 19. The junction joining resistors R10 and R12, pin 4 of comparator 50, capacitor C13, zener diode D6 and MOSFET Q3 is connected to the junction joining, in part, diodes D2 and D4 together.

As can now be readily appreciated, the deleterious effects of providing an unregulated feedback signal have been avoided by directing a portion of the unregulated feedback signal away from the a.c. input side of the ballast rectifier. Regulation in accordance with ballast 10 limits the level of the feedback signal by limiting the voltage gain of the feedback signal. Alternatively, regulation in accordance with ballast 30 can be achieved through reduction in the feedback signal (i.e. cutting the voltage gain of the regulated feedback signal).

It will thus be seen that the objects set forth above, among those made apparent from the preceding description, are efficiently attained and since certain changes may be made in carrying out the above method in regulating the feedback signal without departing from the spirit and scope of the invention, it is intended that all matter contained in the above description shall be interpreted as illustrative and not in a limited sense. It is also to be understood that the following claims are intended to cover all the generic and specific features of the invention herein described and all statements of the scope of the invention which is a matter of language, might be said to fall therebetween.

What is claimed is:

1. A ballast comprising:
   rectifying means for receiving and rectifying a first signal and a regulated feedback signal;
   inverter means for producing an output signal; and
   feedback means for receiving an unregulated feedback signal and for producing said regulated feedback signal, said unregulated feedback signal indicative of said output signal.

2. The ballast of claim 1, wherein said feedback means includes current limiting means for limiting the level of current of said regulated feedback signal.

3. The ballast of claim 2, wherein said current limiting means includes at least one zener diode.

4. The ballast of claim 1, wherein said feedback means includes voltage limiting means for limiting the voltage across said feedback means.

5. The ballast of claim 1, wherein said feedback means includes voltage reducing means for reducing the level of said regulated feedback signal.

6. The ballast of claim 1, wherein said feedback means includes control means for diverting a portion of the unregulated feedback signal whereby the non-diverted portion of the unregulated feedback signal serves as said regulated feedback signal.

7. The ballast of claim 6, wherein said control means exhibits a varying level of capacitance based on the regulated feedback signal.

8. The ballast of claim 7, wherein said control means includes at least two capacitors switchably connected in parallel.

9. The ballast of claim 1, wherein said rectifying means produces a rectified signal and further including storage means for storing the rectified signal and for supplying the rectified signal to said inverter means.

10. The ballast of claim 9, wherein said feedback means includes current reducing means for reducing the level of current of said regulated feedback signal based on the rectified signal.

11. The ballast of claim 9, wherein said feedback means includes voltage limiting means for limiting the voltage across said feedback means based on the regulated feedback signal.

12. The ballast of claim 9, wherein said feedback means includes voltage reducing means for reducing the voltage of the regulated feedback signal based on the rectified signal.

13. The ballast of claim 9, wherein said feedback means includes control means for diverting a portion of the unregulated feedback signal whereby the non-diverted portion of the unregulated feedback signal serves as said regulated feedback signal.

14. A method for ballasting a lamp, comprising:
   rectifying a first signal and a feedback signal so as to produce a rectified signal;
   supplying an output signal to said lamp based on said rectified signal, said feedback signal being indicative of said output signal; and
   regulating said feedback signal based on said rectified signal.

15. The method of claim 14, wherein in regulating said feedback signal the level of current of said feedback signal is reduced.

16. The method of claim 14, wherein in regulating said feedback signal the level of voltage of said feedback signal reduced.

17. A method for ballasting a lamp, comprising:
rectifying a first signal and a feedback signal so as to produce a rectified signal;
supplying an output signal to said lamp based on said rectified signal, said feedback signal being indicative of said output signal; and
regulating said feedback signal based on at least a portion of said output signal.

18. The method of claim 17, wherein in regulating said feedback signal the level of current of said feedback signal is reduced.

19. The method of claim 17, wherein in regulating said feedback signal the voltage gain of said feedback signal is limited.

20. The method of claim 17, wherein in regulating said feedback signal the voltage gain of said feedback signal is reduced.

* * * * *